US 6,686,975 B2

(12) United States Patent
Anderson et al.

(10) Patent No.: US 6,686,975 B2
(45) Date of Patent: Feb. 3, 2004

(54) ACHROMATIC APPARATUS FOR PRODUCING A WAVELENGTH-INDEPENDENT HIGH CONTRAST LIGHT SIGNAL

(75) Inventors: Duncan J. Anderson, Briarcliff Manor, NY (US); Khalid Shahzad, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/852,871

(22) Filed: May 10, 2001

(65) Prior Publication Data

US 2002/0167620 A1 Nov. 14, 2002

(51) Int. Cl.[7] ............................................. G02F 1/1335
(52) U.S. Cl. ........................... 349/5; 349/117; 349/119; 349/121
(58) Field of Search ............................. 349/5, 121, 117, 349/119

(56) References Cited

U.S. PATENT DOCUMENTS

| 5,231,521 A | * | 7/1993 | Johnson et al. | 349/117 |
| 5,243,455 A | * | 9/1993 | Johnson et al. | 349/18 |
| 6,141,071 A | * | 10/2000 | Sharp | 349/121 |
| 6,373,614 B1 | * | 4/2002 | Miller | 359/237 |

FOREIGN PATENT DOCUMENTS

EP     0909974 A2     4/1999     .......... G02F/1/1335

* cited by examiner

*Primary Examiner*—Julie Ngo

(57) ABSTRACT

An apparatus for improved contrast in projection optical systems consists of a polarizing beam splitter (PBS) in combination with two or more waveplates whose fast exes are aligned perpendicular to each other. The apparatus has an effective broadband frequency response that is better than that of the individual retarders acting alone, and through the selection of a birefringence factor and thickness of the individual retarders, wavelength dependencies are minimized.

20 Claims, 4 Drawing Sheets

ACHROMATIC APPARATUS FOR PRODUCING A WAVELENGTH-INDEPENDENT HIGH CONTRAST LIGHT SIGNAL

FIELD OF THE INVENTION

This invention relates to the field of reflective liquid crystal display (LCD) projection, and more particularly to an apparatus for enhancing contrast over a broad wavelength range in an LCD projector.

BACKGROUND OF THE INVENTION

In conventional projection optical architectures, a polarizing beamsplitter (PBS) polarizes an incident light beam and directs that resulting beam to a reflective light valve. In a practical projection system incorporating a light beam having a finite cone angle, the skew rays (not parallel to the optical axis) produce a noticeable degradation in the contrast of the projection system.

One method for correcting such loss of contrast in a reflective liquid crystal display (LCD) is to use a single waveplate which is placed in the beam path and redirects (i.e. transforms) the polarization state of those skewed rays that are reflected from the reflective light valve such that they are effectively reflected by the PBS back toward the light source. In such waveplates, a phase shift is introduced in the light beam that is governed by the equation $$\Phi = (2\pi/\lambda)\Delta n(\lambda) d \qquad [1]$$

where $\Phi$ is the phase shift, $\lambda$ is the particular wavelength, $\Delta n(\lambda)$ represents a birefringence factor of a particular material structure, d is the thickness of the waveplate.

Although the use of such a waveplate significantly improves the system contrast, the single waveplate is designed to be a quarter-wave phase retarder for only one specific wavelength of the incident light beam. Since such quarter-wavelength waveplates are physically constructed to optimally transform only rays having that specific design wavelength, light rays having other wavelengths are not accurately transformed by this waveplate due to the phase mismatch. Again, a less than optimal contrast results. However, such wavelength dependency can be overcome through the use of achromatic waveplates, where phase retardance is independent of the wavelength of the light. See S. Pancharatnum, "Achromatic combination of birefingent plates", Proceedings of Indian Academy of Sciences Vol XLI, No. 4, Sec A, 1955, pp 130–144, A.M. Title, "Improvement of birefringent filters, 2: Achromatic Waveplates" Appl. Optics Vol 14, N1, pp 229–237, 1975, and GB 2331912 Patent "Optical retardance devices".

To overcome similar wavelength limitations in other applications, two or more waveplates have been combined to provide a fixed design phase delay and thus transformation of the polarization state over a broad wavelength range in a same apparatus. "The handbook of Optics Volume II" (SBN 0-07-047974-7 para 3:53) describes the construction of such a broadband waveplate-combination with each waveplate having a distinctive and dissimilar dispersive birefringent materials. By aligning or crossing the optical axes of the waveplates and by carefully selecting their dispersive properties, it is possible to achieve broadband waveplate performance.

SUMMARY

A polarizing beam splitter (PBS) is combined with two or more waveplates, or retarders, to provide a projection optical system that has high contrast over a broadband wavelength spectrum (i.e. a neutral color dark state). Each individual retarder, which is designed to have a unique wavelength response, has its fast axis aligned either parallel or perpendicular to the fast axes of the other retarders in the combination. The resultant combinational retarder has an effective broadband wavelength response that is better than that of the individual retarders acting alone. In addition, the combination provides an effective retarder with a well-defined fast axis, which can be accurately aligned to a hypotenuse surface of the PBS.

By selecting the birefringence factor and thickness of the individual retarders, wavelength dependencies can be minimized or controlled, allowing the combinational retarder to approach true achromaticity. The combinational retarder working in conjunction with the PBS provides a significant improvement in contrast over a broad frequency range than has heretofore been possible.

DETAILED DESCRIPTION OF THE INVENTION

Projection liquid crystal display (LCD) optical systems can exhibit degraded contrast characteristics when incident light beams are composed of light beams having multiple wavelengths. The present invention discloses an apparatus for reducing such degradations.

Figure 1:
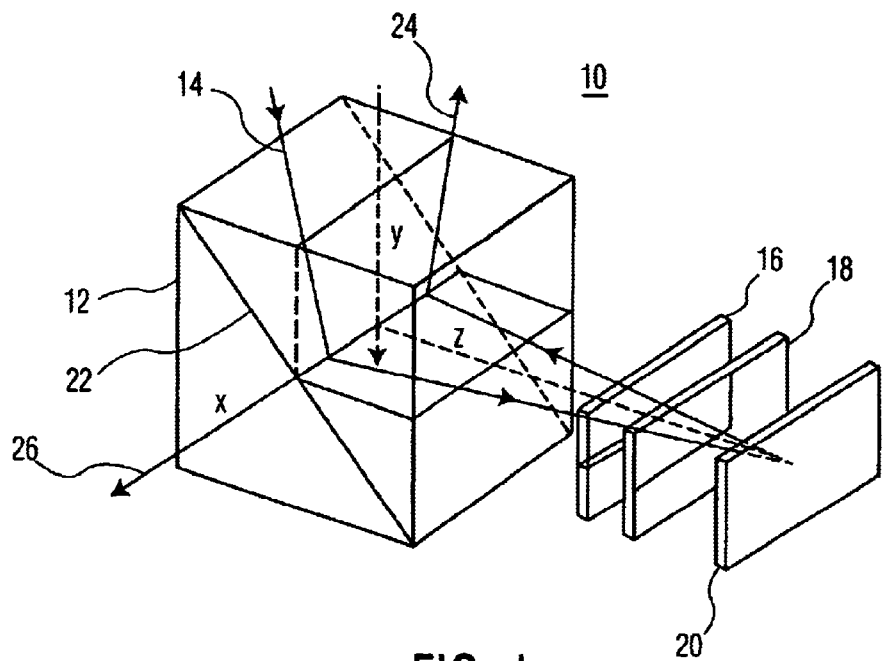
FIG. 1 shows an apparatus for improving contrast in projection optical systems, according to a preferred embodiment of the present invention.

FIG. 1 shows an apparatus 10 for improving contrast in optical projection systems according to a preferred embodiment of the present invention. A polarizing beam splitter (PBS) 12 directs an incident light beam 14 through a first waveplate 16 and a second waveplate 18. Light beam 14 is then subsequently reflected by an LCD device 20 and redirected once again through retarders 16 and 18 towards PBS 12. The retarder combination transforms the polarization of the light reflected from LCD 20 such that the light is effectively reflected at a hypotenuse surface 22 of PBS 12 back toward the light source as light beam 24. Retarders 16 and 18 combine to produce an effective combined retarder that imparts a constant phase change on the incident light that is substantially independent of wavelength. A phase change equivalent to a quarter wave, or $\lambda/4$, is required to ensure that the polarization transformation is effective.

For example, assume first and second retarders 16 and 18 are characterized by a phase retardance of $\Phi_1$ and $\Phi_2$, respectively. The sum $\Phi_1+\Phi_2$ would have to be substantially equal to λ/4 for an incident wavelength of light. Similarly, for multiple retarders, n, where each retarder has a phase retardance $\Phi_n$, the sum of $\Phi_1+\Phi_2+\Sigma_n\Phi_n$ would have to be substantially equal to λ/4 for a given incident wavelength of light for effective polarization transformation.

Additionally, the combined waveplates have a well defined and achromatic effective fast axis that can be accurately aligned to axis 26 of PBS 12. Inaccuracies in this optical alignment can contribute to significant degradation in the compensating characteristics of the apparatus.

Since each individual retarder produces a phase shift that is governed by the equation $$\Phi=(2\pi/\lambda)\Delta n(\lambda)d \quad [2]$$

the combined effects of each pair of the multitude of retarder pairs creates an "effective retarder" which can be characterized as having a phase shift for each wavelength that is described by the equation $$\Phi=(2\pi/\lambda)\{\Delta n_a(\lambda)d_a-\Delta n_b(\lambda)d_b\} \quad [2]$$

where $\Phi$ is the phase, λ is the particular wavelength, $\Delta n_{a,b}$ represents a birefringence factor of a particular material structure, and $d_{a,b}$ is the thickness of the individual waveplates a and b. The cumulative phase shift is the sum of the individual $\Phi$, described by the equation $$\Phi_{Total} = \sum_{n=1}^{m} \Phi_{\lambda n} \quad [3]$$

where m is the number of retarders employed.

Figure 2:
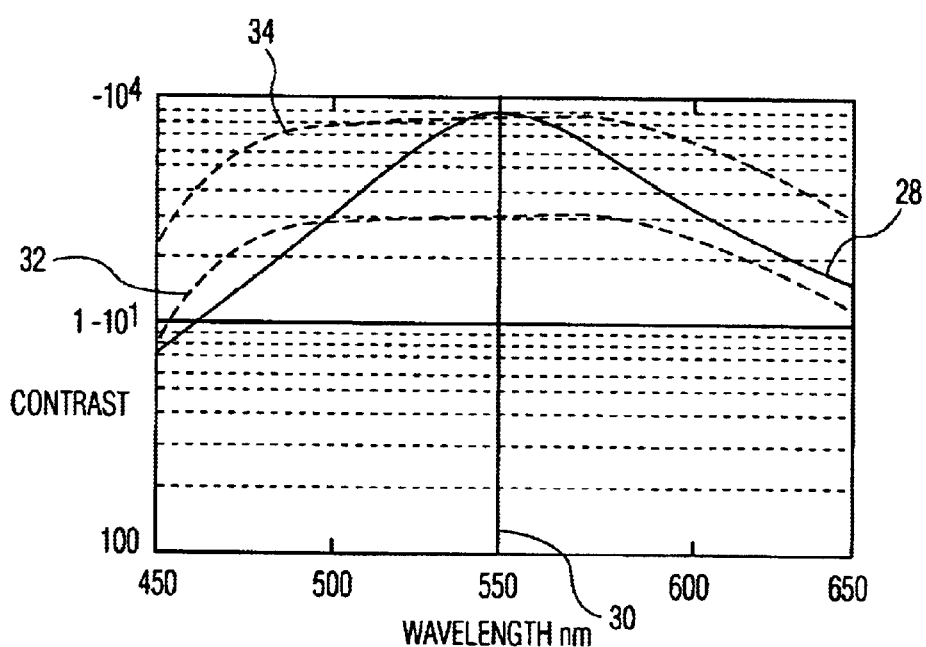
FIG. 2 shows plot of system contrast vs. wavelength of different waveplate configurations.

FIG. 2 shows plots of system contrast as a function of wavelength for different waveplate configurations. Curve 28 shows such a plot for a single reference waveplate designed to be a quarter-wave at a single center wavelength $\lambda_1$ labeled 30 in FIG. 2. Curve 32 shows such a plot for a Pancharatnum-type waveplate combination. The reduced contrast for both the skew and non-skew angle rays results from an alignment "instability" in the effective fast axis of the combined waveplate due to a wavelength dependency of the combined structure. This dependency results primarily from the non-orthogonal orientation of the individual retarder fast axes which is a characteristic of the Pancharatnum-type retarder combinations.

By combining PBS 12 with achromatic retarders 16 and 18 in an orthogonal orientation, resulting curve 34 of FIG. 2 shows a significant increase in broadband contrast over the other two configurations, i.e., curves 28 and 32. The effective achromatic waveplate created by the two waveplates 16 and 18 shows a reduced wavelength dependency, and the axes can be easily crossed and accurately aligned, thereby eliminating the "instability" of the non-achromatic configuration represented by curve 34.

Figure 3:
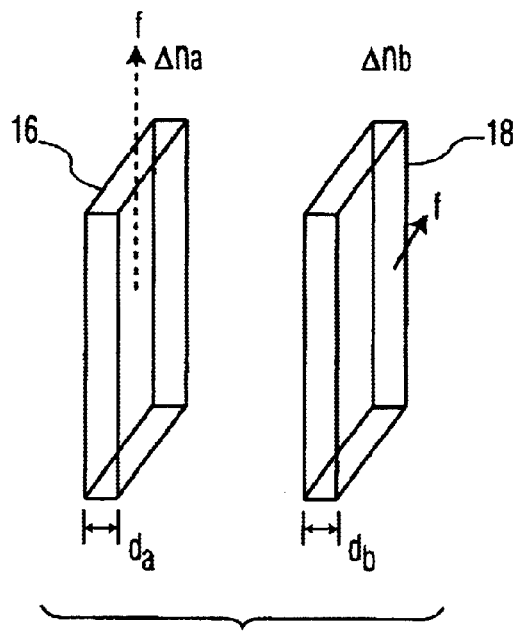
FIG. 3 shows a perspective view of the two retarders used in the configuration shown in FIG. 1.

FIG. 3 shows a perspective view of the two retarders 16 and 18 used in the configuration shown in FIG. 1. The fast axes of each of the two waveplates a & b are indicated by the letter f and are orthogonal to one another. The thickness and birefringence of the elements are represented by $d_a$ and $d_b$, and $\Delta n_a$ and $\Delta n_b$, respectively. Waveplates 16 and 18 are constructed from different materials such that the birefringence properties of the waveplates will be different. Each of the waveplates will in general have a retardance that is substantially higher than a quarter wave of a given wavelength. It is the difference in these retardances (as produced by crossing the fast axes of the retarders) that produces an achromatic quarter-wave retarder.

For example, assume that a first waveplate has an retardance that is equal to x plus $\lambda_1/4$ (one quarter of the length of a first wavelength), where x can be any number from zero to a multiple number of waves (i.e. 0.4λ, 1.25λ, 3λ, etc). This would give a retardance of the first waveplate as $0.4\lambda+\lambda_1/4$, $1.25\lambda+\lambda_1/4$, $3\lambda+\lambda_1/4$, etc, respectively. Aligning the fast axis of this exemplary first waveplate with the fast axis of a second waveplate having an exemplary retardance equal to x, will in all cases yield an effective retardance of $\lambda_1/4$ for the combination. The principal characteristic of the pair of retarders is that the fast axes are aligned orthogonally, and the combination thus constructed will exhibit a unique fixed ¼ wave retardance over a broader range of individual wavelengths centered around wavelength $\lambda_1$ than would be the case for each retarder acting alone.

Figure 4:
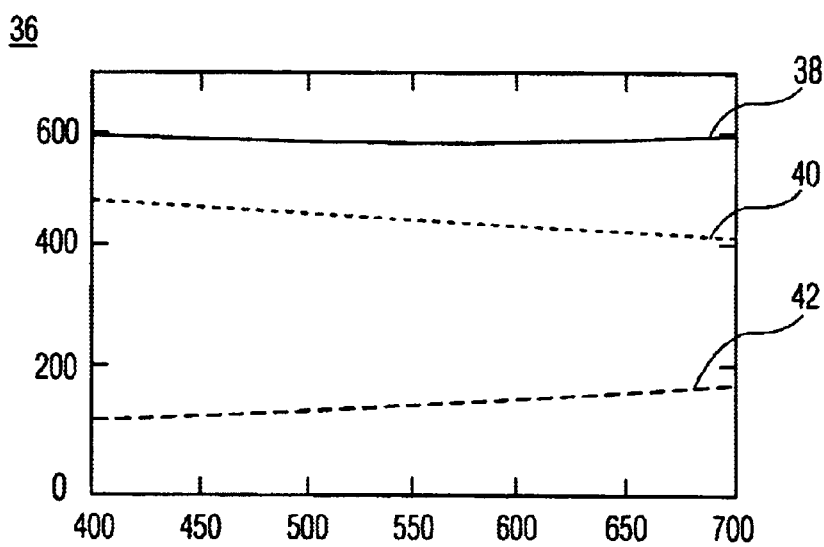
FIGS. 4 and 5 show alternate representations of the retardance and phase shift effects, respectively, of the retarders in the preferred embodiment shown in FIG. 1.
Figure 5:
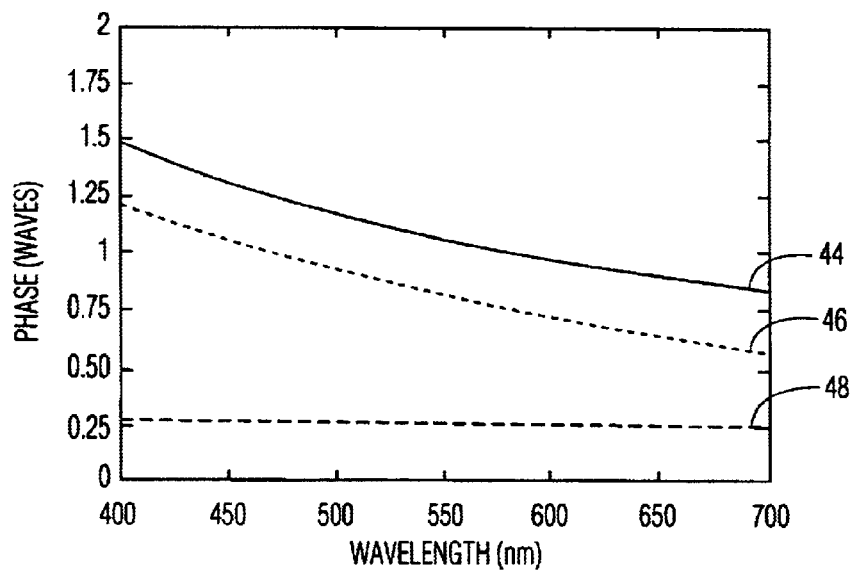

FIGS. 4 and 5 show alternate representations of the retardance and phase shift effects, respectively, of the retarders 16 and 18 shown in FIG. 1. In FIG. 4, curve 38 shows a plot of retardance as a function of wavelength for an exemplary first retarder 16. Curve 40 shows a retardance plot for a second exemplary retarder 18. Curve 42 shows a retardance plot of the "effective" retarder created by the combination of retarders 16 and 18. Note that curve 42 exhibits a retardance that is proportional to the wavelength.

In FIG. 5, phase shift is plotted as a function of wavelength over the same range of wavelengths shown in FIG. 4. Curves 44 and 46 represent the exemplary phase shifts associated with retarders 16 and 18, respectively. Curve 48 represents an exemplary combination of retarders 16 and 18 showing minimal slope of the phase shift over the wavelength range.

FIGS. 6 through 9 show perspective views of the retarder pairs in various exemplary configurations. Different unique combinations of retarders can provide specific achromatic improvements in a system's optical properties. For each of the configurations shown in FIGS. 6 through 9, a refractive index profile of a uniaxial retarder consists of an ordinary refractive index, $n_o$, lying in a plane and an extraordinary refractive index, $n_e$, which is orthogonal to that plane.

A relative directional vector is shown for each axis in each of the configurations. Defining an A-plate retarder as being comprised of a uniaxial material whose extraordinary refractive index lies in the broad planar surface of the retarder, when the extraordinary refractive index, $n_e$ is smaller that the ordinary index, $n_o$, the plate is a negative A-plate. Alternatively, when $n_e$ is larger than $n_o$, the plate is a positive A-plate.

In FIGS. 6–9, the phase retardance of each waveplate for a given skew ray is a function of a polar angle θ and an azimuthal angle Θ of the light rays inside the retarder with respect to a principal light beam direction and is governed by the equation $$\Phi(\theta,\Theta)=(2\pi/\lambda\cos\theta)\Delta n(\theta,\Theta)d \quad [4]$$

An off-axis phase retardance of a waveplate can be held constant by varying the birefringence, Δn (θ,Θ), to compensate for the cosθ term in the denominator of equation [4], such as by using waveplates whose out-of-plate refractive index, $n_z$, is less than or equal to the smallest in-plane refractive index, i.e., the fast axis. Since the fast axis for the positive A-plate is in the no direction and since the fast axis for the negative A-plate in the $n_e$ direction, the positive A-plate performs better off-axis than the negative A-plate since the off-axis retardance of the positive A-plate can be designed to remain substantially the same as its on-axis phase retardance.

Figure 6:
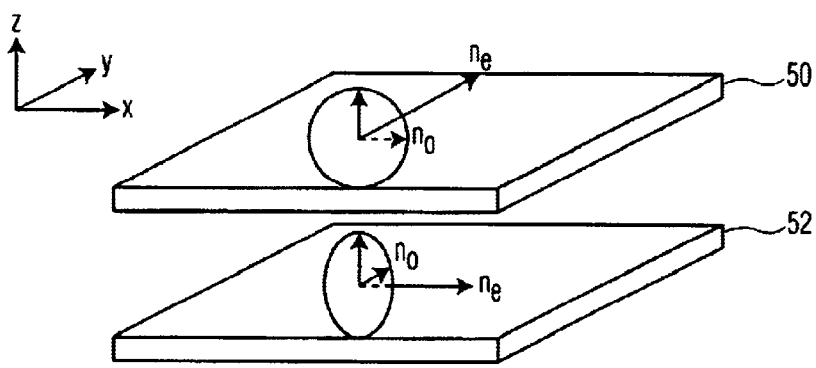
FIG. 6 shows a perspective view of two positive A-plate retarders.

FIG. 6 shows a perspective view of two positive A-plate retarders 50 and 52 having an orthogonal orientation.

Figure 7:
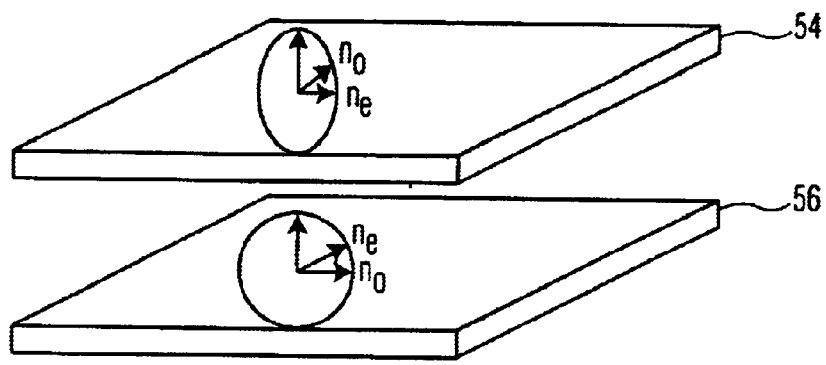
FIG. 7 shows a perspective view of two negative A-plate retarders.

FIG. 7 shows a perspective view of two negative A-plate retarders 54 and 56 having an orthogonal orientation.

Figure 8:
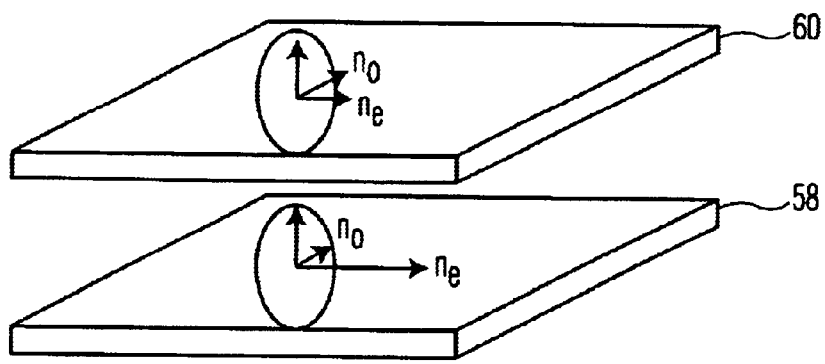
FIG. 8 shows a perspective view of a positive A-plate retarder in combination with a negative A-plate retarder.

FIG. 8 shows an A-plate combination having a positive A-plate 58 and a negative A-plate 60.

Figure 9:
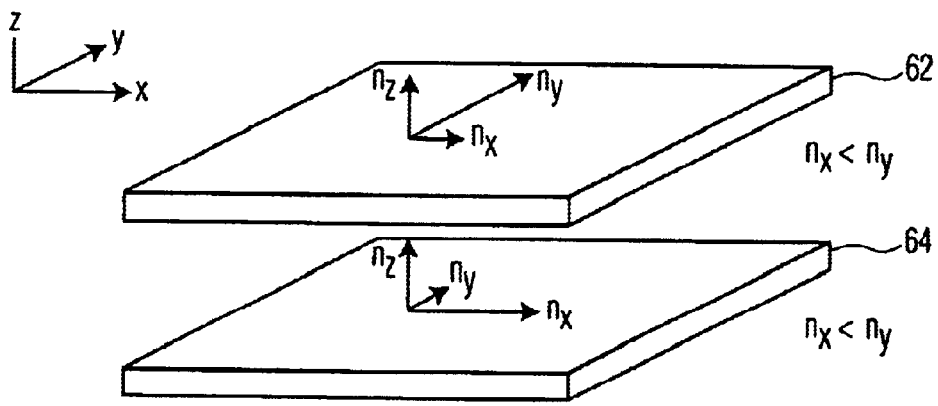
FIG. 9 shows a perspective view of two biaxial retarders.

Biaxial type retarders can also be used to produce the desired achromatic properties. As is known in the art, a biaxial retarder consists of three othrogonal refractive indices whose values are all different. FIG. 9 shows a perspective view of two exemplary biaxial retarders 62 and 64. It can be appreciated that various combinations of biaxial and A-plate retarders can also be used with equal effect.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the appended claims is reserved.

What is claimed is:

1. An apparatus for improving contrast in a projection liquid crystal display (LCD), said apparatus comprising:
    a polarizing beam splitter (PBS);
    a first waveplate having a fast axis;
    at least a second waveplate having a fast axis;
    a mounting structure incorporating said PBS and said waveplates in a predetermined orientation;
    wherein the fast axes of the first waveplate and the at least a second waveplate are aligned either parallel or perpendicular to one another; and
    wherein an incident light is sequentially reflected and directed by said PBS beam through said waveplates to the LCD, reflected and redirected by the LCD through said waveplates to said PBS, and reflected and redirected by said PBS to a light source of the incident light.

2. The apparatus according to claim 1, wherein the orientation of the first waveplate to the second waveplate is such that the fast optical axes of the waveplates are perpendicular.

3. The apparatus according to claim 1, wherein the effective waveplate comprising the first and second waveplates is achromatic.

4. The apparatus according to claim 1, wherein the first waveplate is one selected from the group consisting of a biaxial waveplate and a uniaxial waveplate.

5. The apparatus according to claim 1, wherein the second waveplate is one selected from the group consisting of a biaxial waveplate and a uniaxial waveplates.

6. The apparatus according to claim 1, wherein the first waveplate is one selected from the group consisting of a positive uniaxial plate and a negative uniaxial plate, wherein a first extraordinary refractive index of said positive uniaxial plate is greater than a first ordinary refractive index of said positive uniaxial plate, and wherein a second extraordinary refractive index of said negative uniaxial plate is less than a second ordinary refractive index of said negative uniaxial plate.

7. The apparatus according to claim 1, wherein the second waveplate is one selected from the group consisting of a positive uniaxial plate and a negative uniaxial plate, wherein a first extraordinary refractive index of said positive uniaxial plate is greater than a first ordinary refractive index of said positive uniaxial plate, and wherein a second extraordinary refractive index of said negative uniaxial plate is less than a second ordinary refractive index of said negative uniaxial plate.

8. The apparatus according to claim 1, wherein the first and second waveplates are each characterized by a phase retardance governed by the equation $\Phi=(2\pi/\lambda)\Delta n(\lambda)d$.

9. The apparatus according to claim 1, wherein the combinational entity comprising the first and second waveplates is characterized by a retardance which is governed by the equation $\Phi=(2\pi/\lambda)\{\Delta n_a(\lambda)d_a - \Delta n_b(\lambda)db\}$.

10. An apparatus for providing a wavelength-independent optical signal in response to an incident optical signal, said apparatus comprising:
    a projection liquid crystal display (LCD);
    a polarizing beam splitter (PBS);
    a first achromatic waveplate having a fast axis;
    at least a second achromatic waveplate having a fast axis;
    a mounting structure incorporating the PBS and the waveplates in a predetermined orientation;
    wherein the fast axes of the first waveplate and the at least a second waveplate are aligned either parallel or perpendicular to one another; and
    wherein the incident optical signal is sequentially reflected and directed by said PBS beam through said waveplates to said LCD, reflected and redirected by the LCD through said waveplates to said PBS, and reflected by said PBS as the wavelength independent optical signal.

11. The apparatus according to claim 10, wherein the first waveplate has a phase retardance $\Phi_1$ and the second waveplate has a phase retardance $\Phi_2$ such that the sum of $\Phi_1+\Phi_2$ produces an effective broadband phase retardance that is substantially equal to one quarter-wave for an incident illuminating wavelength of light.

12. The apparatus according to claim 11, further comprising an additional n waveplates each having a phase retardance described by $\Phi_n$ such that the sum $\Phi_1+\Phi_2+\Sigma_n\Phi_n$ produces an effective broadband phase retardance that is substantially equal to one quarter-wave for an incident illuminating wavelength of light.

13. The apparatus according to claim 10, wherein the orientation of the first waveplate to the second waveplate is such that the fast optical axes of the waveplates are perpendicular.

14. The apparatus according to claim 10, wherein the effective waveplate comprising the first and second waveplates is achromatic.

15. The apparatus according to claim 10, wherein the first waveplate is one selected from the group consisting of a biaxial waveplate and a uniaxial waveplates.

16. The apparatus according to claim 10, wherein the first waveplate is one selected from the group consisting of a biaxial waveplate and a uniaxial waveplates.

17. The apparatus according to claim 10, wherein the first waveplate is one selected from the group consisting of a positive uniaxial plate and a negative uniaxial plate, wherein a first extraordinary refractive index of said positive uniaxial plate is greater than a first ordinary refractive index of said positive uniaxial plate, and wherein a second extraordinary refractive index of said negative uniaxial plate is less than a second ordinary refractive index of said negative uniaxial plate.

18. The apparatus according to claim 10, wherein the second waveplate is one selected from the group consisting of a positive uniaxial plate and a negative uniaxial plate, wherein a first extraordinary refractive index of said positive uniaxial plate is greater than a first ordinary refractive index of said positive uniaxial plate, and wherein a second extraordinary refractive index of said negative uniaxial plate is less than a second ordinary refractive index of said negative uniaxial plate.

19. The apparatus according to claim 10, wherein the first waveplate has a phase retardance $\Phi_1$ and the second waveplate has a phase retardance $\Phi_2$ such that the sum of $\Phi_1+\Phi_2$ produces an effective broadband phase retardance that is substantially equal to one quarter-wave for an incident illuminating wavelength of light.

20. The apparatus according to claim 19, further comprising additional n waveplates each having a phase retardance described by $\Phi_n$ such that the sum of $\Phi_1+\Phi_2+\Sigma_n\Phi_n$ produces an effective broadband phase retardance that is substantially equal to one quarter-wave for an incident illuminating wavelength of light.

* * * * *